United States Patent
Li et al.

(10) Patent No.: US 11,170,804 B2
(45) Date of Patent: Nov. 9, 2021

(54) SPIN ORBITAL TORQUE BASED MICROWAVE ASSISTED MAGNETIC RECORDING WITH DUAL SPIN HALL LAYERS OR WRAP AROUND SPIN HALL LAYER

(71) Applicant: Western Digital Technologies, Inc., San Jose, CA (US)

(72) Inventors: Zhanjie Li, Pleasanton, CA (US); Suping Song, Fremont, CA (US); Lijie Guan, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/107,611

(22) Filed: Nov. 30, 2020

(65) Prior Publication Data

US 2021/0082458 A1  Mar. 18, 2021

Related U.S. Application Data

(62) Division of application No. 16/453,991, filed on Jun. 26, 2019, now Pat. No. 10,867,626.

(51) Int. Cl.
*G11B 5/37* (2006.01)
*G11B 5/235* (2006.01)
(Continued)

(52) U.S. Cl.
CPC .............. *G11B 5/37* (2013.01); *G11B 5/1278* (2013.01); *G11B 5/235* (2013.01); *G11B 5/314* (2013.01);
(Continued)

(58) Field of Classification Search
None
See application file for complete search history.

(56) References Cited

U.S. PATENT DOCUMENTS 8,582,240 B1   11/2013   Chen et al.
8,842,387 B1   9/2014    Horide et al.
(Continued)

FOREIGN PATENT DOCUMENTS

CN  104835510 B    11/2017
JP  2013251042 A   12/2013
WO  2018111356 A1  6/2018

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).
(Continued)

*Primary Examiner* — Craig A. Renner
(74) *Attorney, Agent, or Firm* — Patterson & Sheridan, LLP; Steven H. Versteeg

(57) ABSTRACT

A magnetic recording head includes a trailing shield and a main pole. A trailing shield gap is between the trailing shield and the main pole. A spin orbital torque structure is within the trailing shield gap. The spin orbital torque structure includes a spin torque layer having a first side and a second side at a media facing surface. A first spin Hall layer is along the first side of the spin torque layer. A second spin Hall layer is along the second side of the spin torque layer. The first spin Hall layer comprises a heavy metal material having a positive spin Hall angle. The second spin Hall layer comprises a heavy metal material having a negative spin Hall angle.

20 Claims, 15 Drawing Sheets

(51) Int. Cl.
*G11B 5/31* (2006.01)
*G11B 5/127* (2006.01)
*G11B 5/00* (2006.01)

(52) U.S. Cl.
CPC ............ *G11B 5/315* (2013.01); *G11B 5/3146* (2013.01); *G11B 2005/0024* (2013.01)

(56) References Cited

U.S. PATENT DOCUMENTS

| | | |
|---|---|---|
| 9,230,571 B1 | 1/2016 | Chen et al. |
| 9,275,672 B2 | 3/2016 | Shiroishi et al. |
| 9,368,135 B2 | 6/2016 | Gao |
| 9,806,710 B2 | 10/2017 | Flatté |
| 9,881,637 B1 | 1/2018 | Wilson et al. |
| 10,014,012 B1* | 7/2018 | Song et al. ............ G11B 5/235 |
| 10,121,497 B1 | 11/2018 | Takahashi et al. |
| 10,157,632 B1 | 12/2018 | Song et al. |
| 10,186,284 B2 | 1/2019 | Narita et al. |
| 10,210,888 B1 | 2/2019 | Li et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 10,580,441 B1 | 3/2020 | Chen et al. |
| 2008/0304176 A1 | 12/2008 | Takagishi et al. |
| 2009/0059423 A1 | 3/2009 | Yamada et al. |
| 2009/0310244 A1 | 12/2009 | Shimazawa et al. |
| 2013/0250456 A1 | 9/2013 | Yamada et al. |
| 2014/0139952 A1 | 5/2014 | Takeo et al. |
| 2014/0177100 A1 | 6/2014 | Sugiyama et al. |
| 2016/0027455 A1 | 1/2016 | Kudo et al. |
| 2017/0236537 A1 | 8/2017 | Murakami et al. |
| 2018/0166500 A1 | 6/2018 | Wang et al. |
| 2018/0268848 A1 | 9/2018 | Narita et al. |
| 2019/0088274 A1 | 3/2019 | Narita et al. |
| 2019/0147907 A1* | 5/2019 | Li et al. ................. G11B 5/314 360/112 |

OTHER PUBLICATIONS

Martin Collet et al.; Abstract Auto-Oscillation and Spin-Wave Propagation in Ultra-Thin YIG Microstructure (Conference Presentation); Proceedings Paper, SPIE Proceedings vol. 10357; Sep. 21, 2017.

Jiawei Yu et al. "SpinOrbit Torques and Dzyaloshinskii-Moriya Interaction in Dual-Interfaced Co—Ni Multilayers" Scientific Reports; https://www.nature.com/scientificreports; Sep. 7, 2016 (9 pages).

Guoqiang Yu et el. "Switching of Perpendicular Magnetization by Spin-Orbit Torques in the Absence of External Magnetic Fields" Nature Nanotechnology, https://www.nature.com/naturenanotechnology; vol. 9; May 11, 2014, pp. 548-554.

M.Collet et al.; "Generation of Coherent Spin-Wave Modes in Yttrium Iron Garnet Microdises by Spin-Orbit Torque"; https://arxiv.org/abs/1504.01512; Apr. 7, 2018 (7 pages).

Nguyen Huynh Duy Khang et al; "A Conductive Topological Insulator with Large Spin Hall Effect for Ultralow Power Spin-Orbit Torque Switching" Nature Materials, https://www.nature.com/naturematerials, vol. 17; Sep. 2018, pp. 808-813.

Zhou Zikai et al., Abstract of Ion-modulated Heavy Metal/Magnetic Insulator Double-Layer Structure for Voltage-adjustable Spintronic Devices, Advanced Materials; https://translate.google.co.in/translate?hl=en&sl=zh-CN&u=http://www.cailiaoniu.com/151613.html&prev.search, Sep. 1, 2018, 8 pages.

* cited by examiner

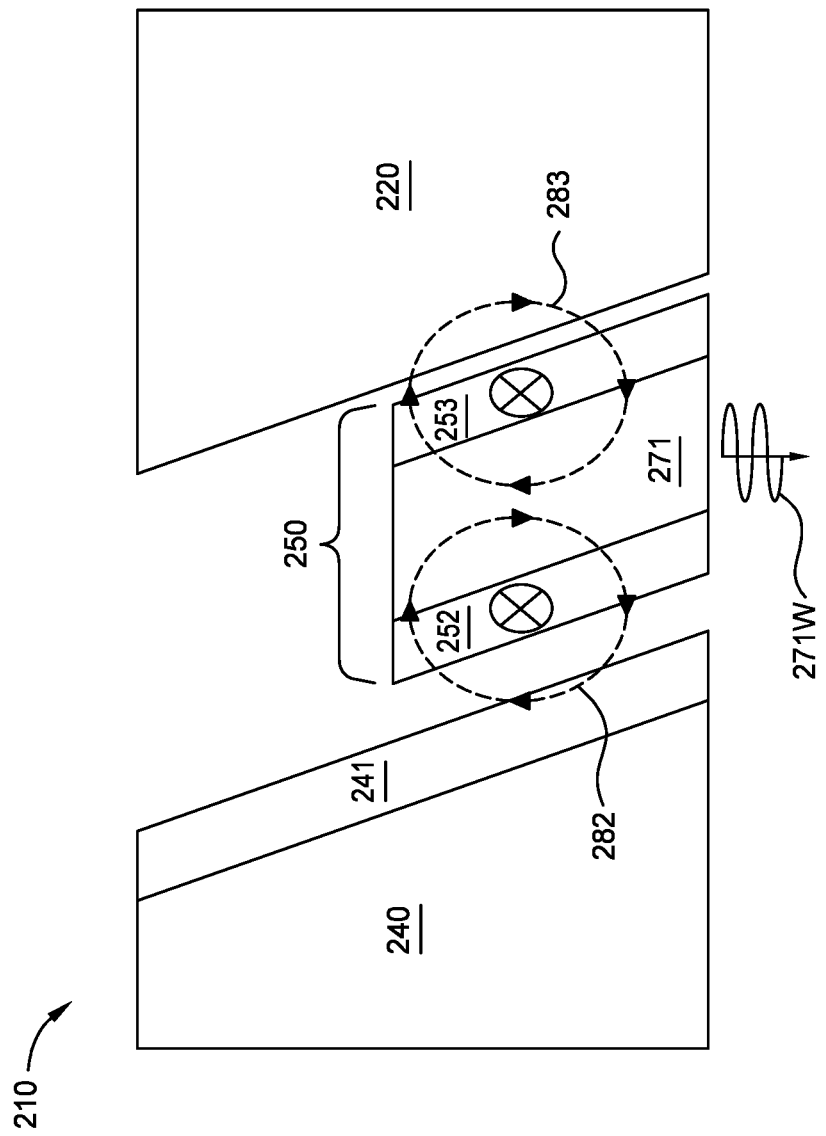

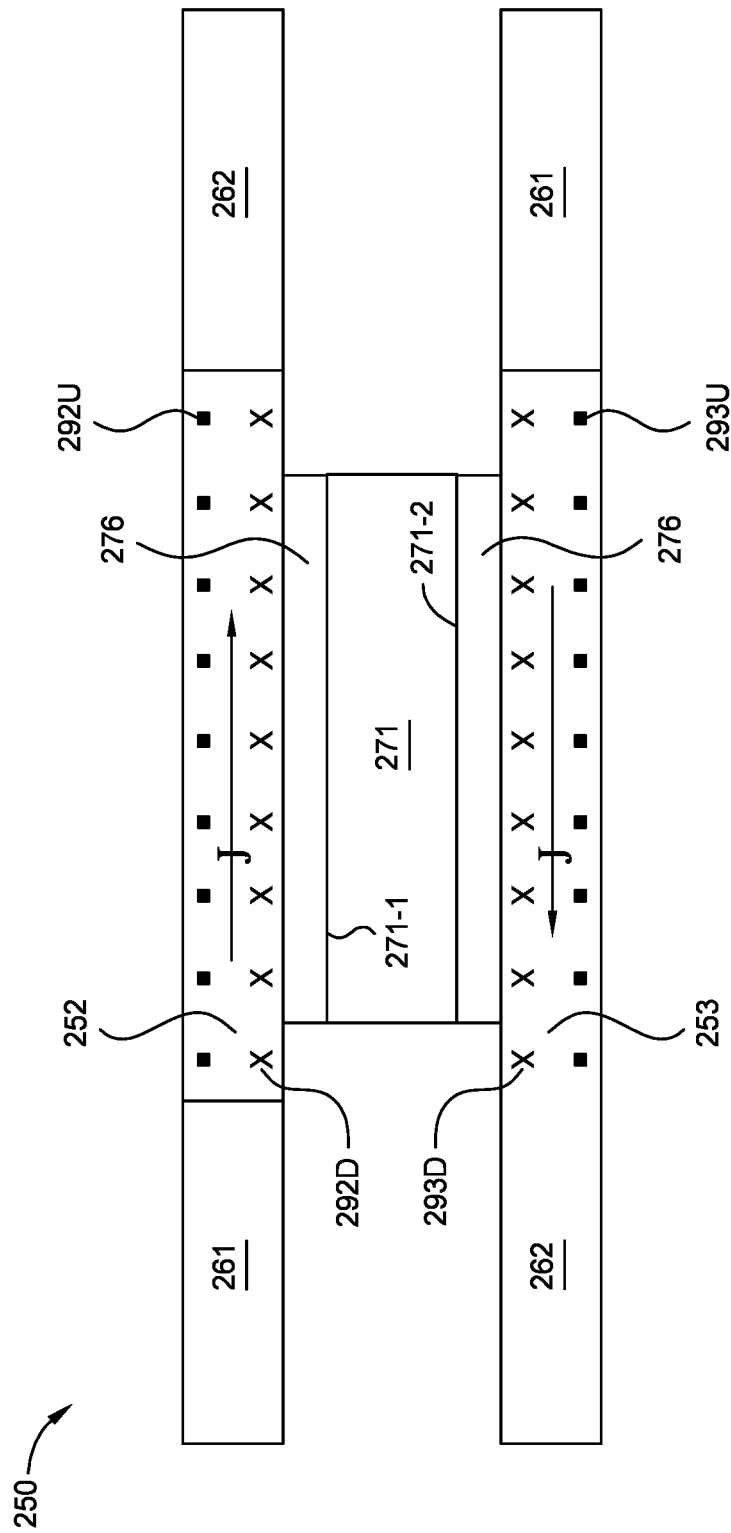

SPIN ORBITAL TORQUE BASED MICROWAVE ASSISTED MAGNETIC RECORDING WITH DUAL SPIN HALL LAYERS OR WRAP AROUND SPIN HALL LAYER

CROSS-REFERENCE TO RELATED APPLICATIONS

This application is a divisional of U.S. patent application Ser. No. 16/453,991, filed Jun. 26, 2019, which is herein incorporated by reference.

BACKGROUND OF THE DISCLOSURE

Field of the Disclosure

Embodiments of the present disclosure generally relate to data storage devices, and more specifically, to a magnetic media drive employing a microwave assisted magnetic recording (MAMR) write head based on spin orbital torque (SOT).

Description of the Related Art

Over the past few years, microwave assisted magnetic recording (MAMR) has been studied as a recording method to improve the areal density of a magnetic media drive, such as a hard disk drive (HDD). One type of MAMR enabled magnetic recording is based on spin-transfer torque (STT). During operation, electrical current flows from the main pole to the trailing shield through a field generation layer. Transmitted polarized electrons from a spin polarization layer and/or from reflected electrons are injected into the field generation layer causing switching or precession of the magnetization of the field generation layer by spin transfer torque (STT) from the injected electrons. Precession of the magnetization of the field generation layer generates an assisting AC field to the write field.

Another type of MAMR enabled magnetic recording is based on spin-orbital torque (SOT). During operation, charge current through a spin Hall layer generates a spin current in the spin Hall layer. The spin currents from the spin Hall layer exert a spin orbital torque that causes the magnetization of a spin torque layer (STL) to switch or precession. Precession of the magnetization of the STL generates an AC assisting field or a DC assisting field to the write field. MAMR write heads based on SOT generating an AC assisting field have multiple times greater power efficiency in comparison to MAMR write heads based on STT.

FIG. 1A is one example of a schematic media facing surface (MFS) view of a MAMR write head 10 based upon on SOT. FIG. 1B is a fragmented, cross-sectional side view of the write head 10 along plane A-A of FIG. 1A. A SOT structure 50 is disposed between a trailing shield 40 and a main pole 20. The SOT structure 50 comprises a ferromagnetic spin-torque layer (STL) 71 disposed on the bottom of a spin Hall layer 52. A charge current (J) is flowed through the spin Hall layer 52 in a cross-track direction. As shown in FIG. 1B, the charge current is being flowed into the plane of the figure as represented by an "X." This charge current through the spin Hall layer 52 produces an ampere magnetic field 80. The ampere magnetic field 80 which acts on the ferromagnetic STL 71 and degrades the ferromagnetic STL 71 over time, reducing the reliability of the SOT structure 50. Therefore, there is a need for an improved MAMR write head based on SOT.

SUMMARY OF THE DISCLOSURE

In one embodiment, a magnetic recording head includes a trailing shield and a main pole. A trailing shield gap is between the trailing shield and the main pole. A spin orbital torque structure is within the trailing shield gap. The spin orbital torque structure includes a spin torque layer having a first side and a second side at a media facing surface. A first spin Hall layer is along the first side of the spin torque layer. A second spin Hall layer is along the second side of the spin torque layer. The first spin Hall layer comprises a heavy metal material having a positive spin Hall angle. The second spin Hall layer comprises a heavy metal material having a negative spin Hall angle.

In another embodiment, a magnetic recording head includes a trailing shield and a main pole. A trailing shield gap is between the trailing shield and the main pole. A spin torque layer is within the trailing shield gap. The spin torque layer has a first side, a second side, and a third side at a media facing surface. A spin Hall structure is wrapped around the first side, the second side, and the third side of the spin torque layer.

In still another embodiment, a magnetic recording head includes a trailing shield and a main pole. A trailing shield gap is between the trailing shield and the main pole. A spin torque layer is within the trailing shield gap. The spin torque layer has a media facing surface. A spin Hall means is disposed within the trailing shield gap. The spin Hall means is for producing two or more spin current in the same direction along at least two sides of the spin torque layer at the media facing surface. The spin Hall means is also for producing two or more ampere magnetic fields.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4B is a fragmented, cross-sectional side view of certain embodiments of a write head along plane B-B of FIG. 4A.

FIG. 8B is an enlarged schematic MFS view of certain embodiments of a SOT structure of FIG. 8A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments generally relate to a magnetic media drive employing a microwave assisted magnetic recording (MAMR) write head based on spin orbital torque (SOT). In certain embodiments, a write head includes a SOT structure with dual spin Hall layers along two sides of a spin torque layer. The dual spin Hall layers have opposite spin Hall angles. In certain embodiments, a write head includes a SOT structure with a single spin Hall layer wrapped around a spin torque layer.

Figure 1A:
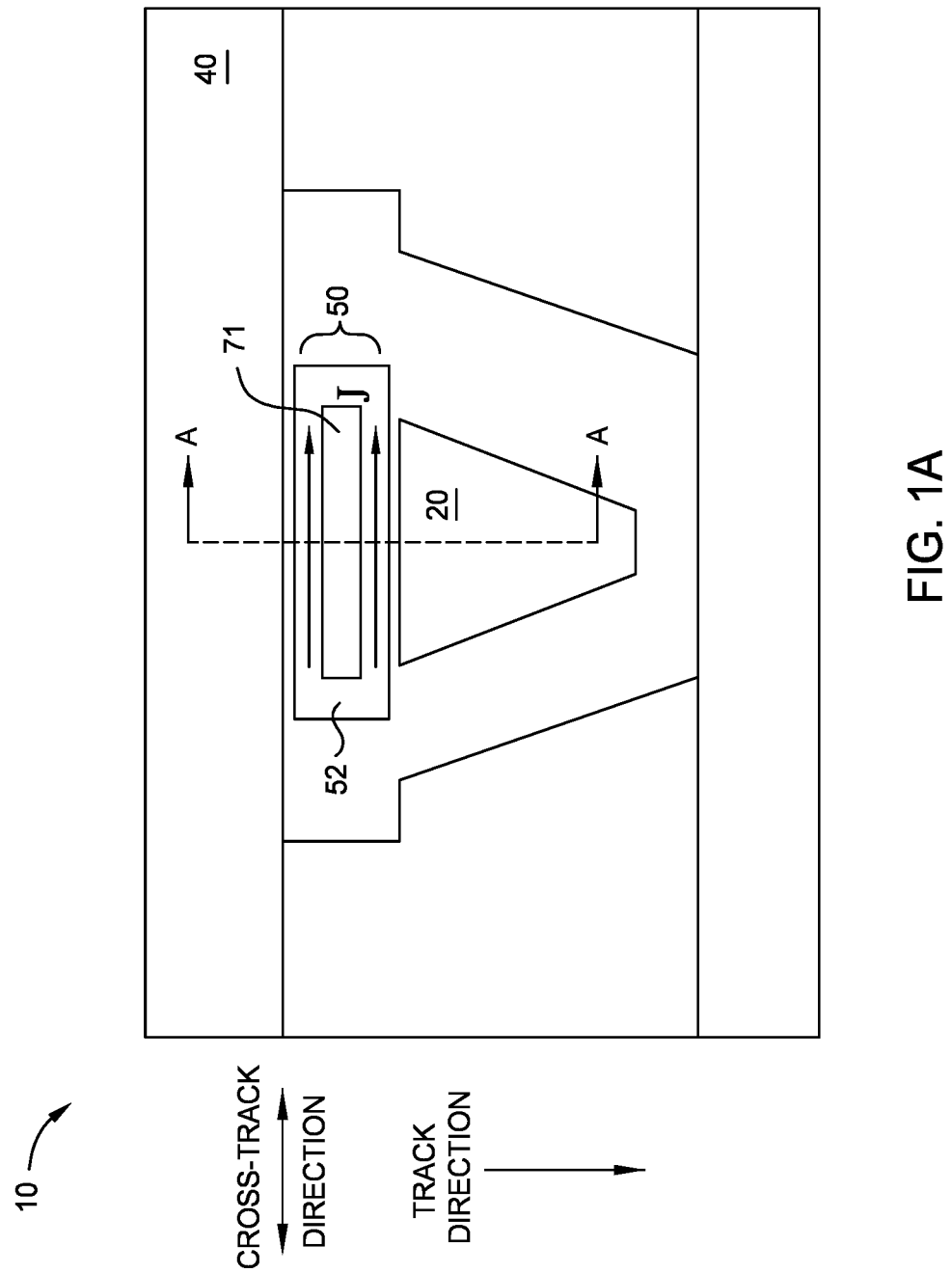
FIG. 1A is one example of a schematic MFS view of a MAMR write head based upon based on SOT.
Figure 1B:
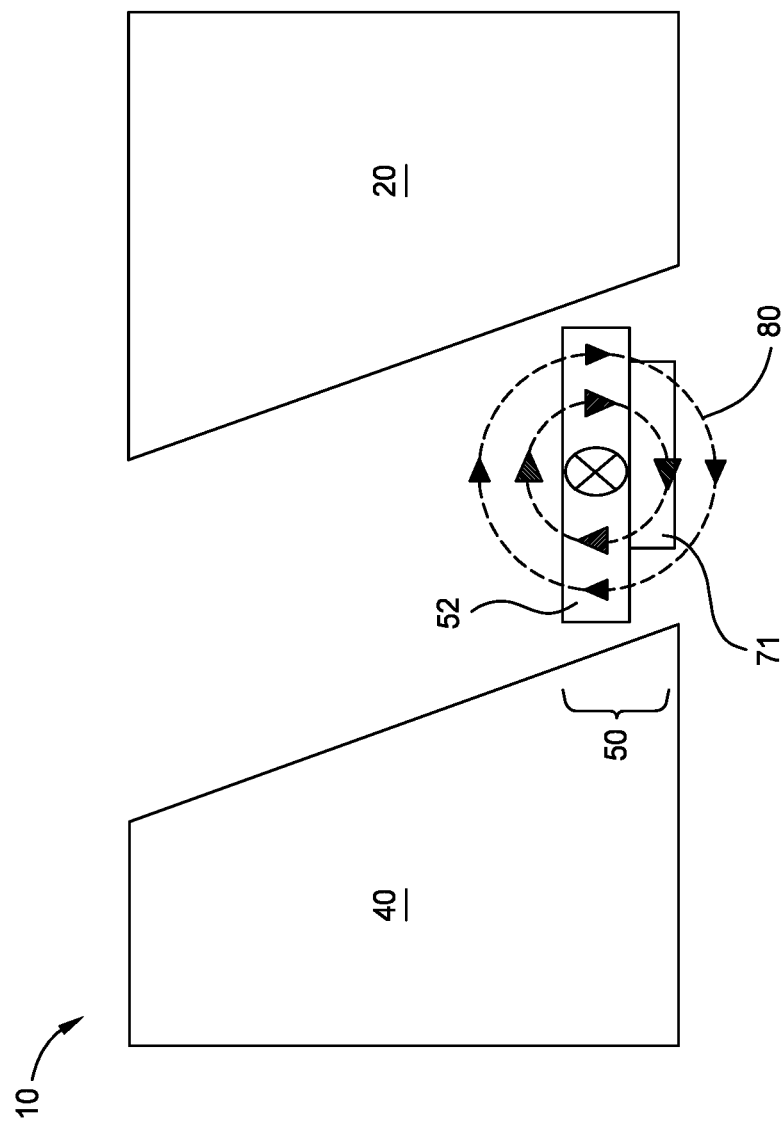
FIG. 1B is a fragmented, cross-sectional side view of the write head along plane A-A of FIG. 1A.
Figure 2:
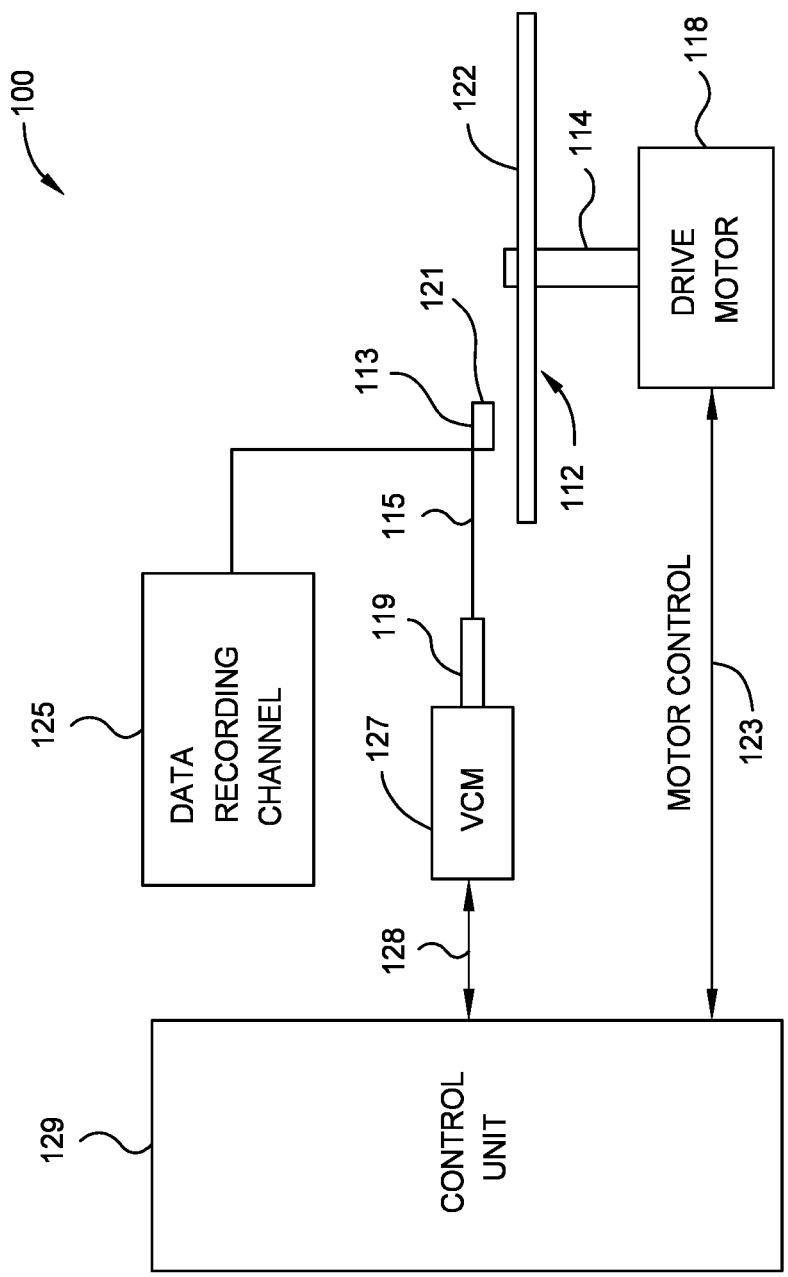
FIG. 2 is a schematic illustration of a data storage device, such as a magnetic media drive.

FIG. 2 is a schematic illustration of a data storage device, such as a magnetic media drive. Such a data storage device may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a spin Hall structure for generating SOT. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 2 are for representation purposes only. It should be apparent that magnetic media drives may contain a large number of media, or disks, and actuators, and each actuator may support a number of sliders.

Figure 3:
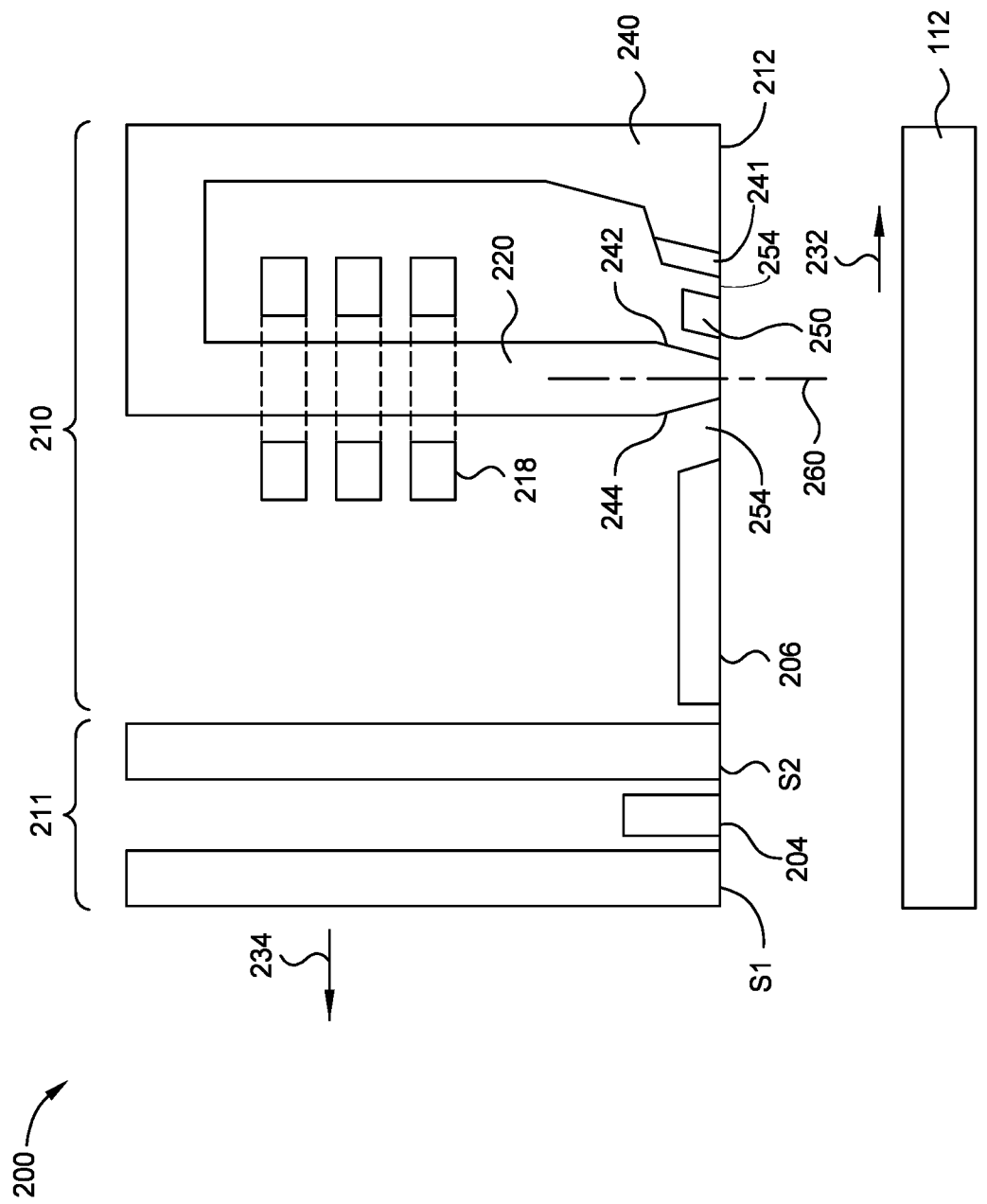
FIG. 3 is a fragmented, cross-sectional side view of a read/write head facing the magnetic disk according to certain embodiments.

FIG. 3 is a fragmented, cross-sectional side view of a read/write head 200 facing the magnetic disk 112 according to certain embodiments. The read/write head 200 may correspond to the magnetic head assembly 121 described in FIG. 2. The read/write head 200 includes a MFS 212, such as an air bearing surface (ABS), facing the disk 112, a magnetic write head 210, and a magnetic read head 211. As shown in FIG. 3, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a spin orbital torque (SOT) structure 250, and a coil 218 that excites the main pole 220. The coil 218 may have a "pancake" structure which winds around a back-contact between the main pole 220 and the trailing shield 240, instead of a "helical" structure shown in FIG. 3. The SOT structure 250 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer 241. The trailing shield hot seed layer 241 can include a high moment sputter material, such as CoFeN or FeXN, where X includes at least one of Rh, Al, Ta, Zr, and Ti. In certain embodiments, the trailing shield 240 does not include a trailing shield hot seed layer.

Figure 4A:
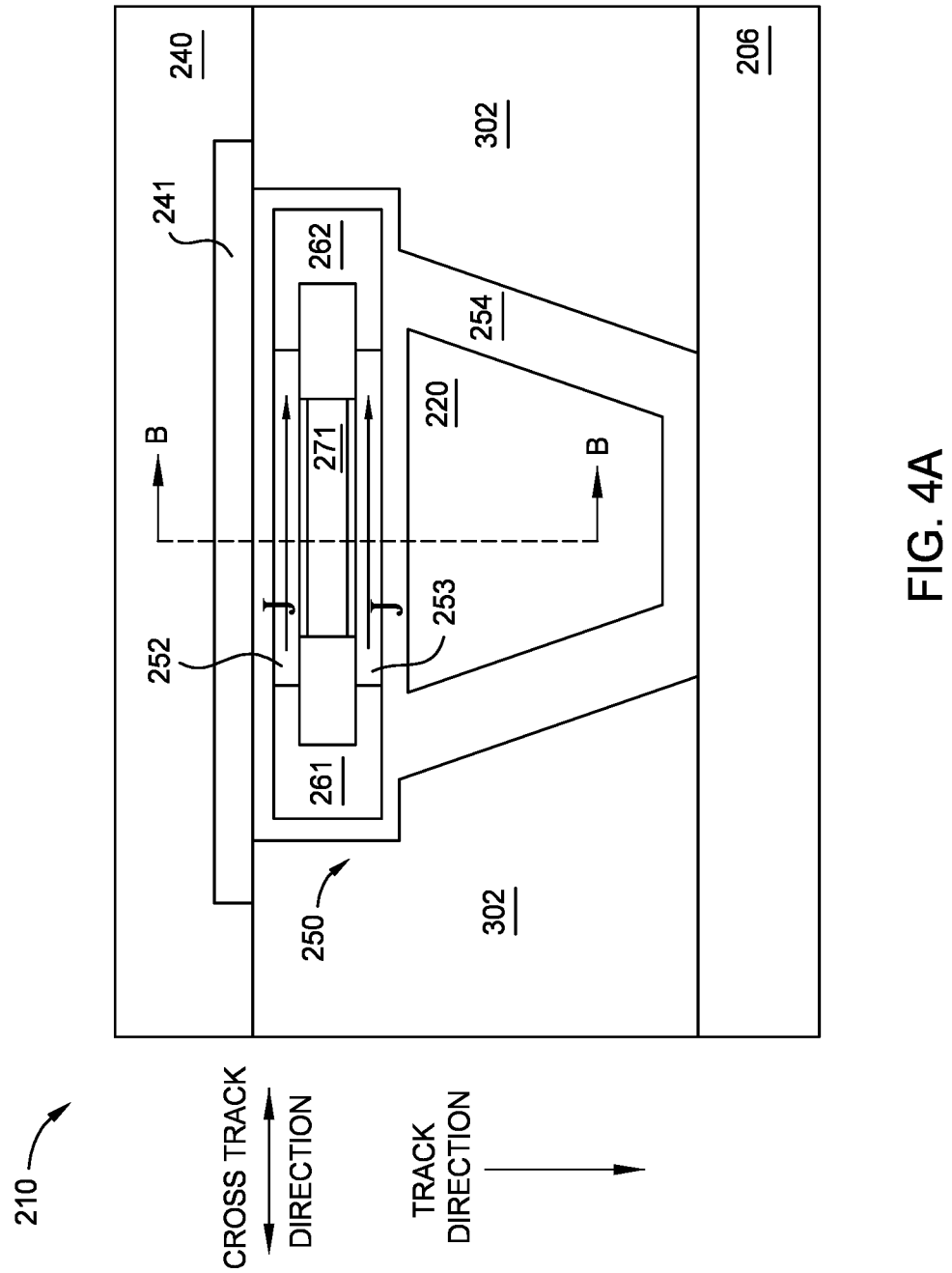
FIG. 4A is a schematic MFS view of certain embodiments of a portion of a write head.

FIG. 4A is a schematic MFS view of certain embodiments of a portion of a write head 210, such as the write head of the drive 100 of FIG. 2 or other suitable magnetic media drives. FIG. 4B is a fragmented, cross-sectional side view of certain embodiments of the write head 210 along plane B-B of FIG. 4A. As shown in FIGS. 4A-B, the write head 210 includes a SOT structure 250 between a trailing shield 240 and a main pole 220 having a trailing taper. As shown in FIG. 4A, the write head 210 further includes side shields 302 sandwiching the main pole 220 along the cross-track direction and a leading shield 206 in a track direction. The side shields 302 can be in direct contact with the leading shield 206 and the trailing shield 240.

The SOT structure 250 comprises a first spin Hall layer 252, a second spin Hall layer 253, and a spin torque layer (STL) 271 between the first spin Hall layer 252 and the second spin Hall layer 253. The first spin Hall layer 252 comprises a heavy metal having a first spin Hall angle, and the second spin Hall layer 253 comprises a heavy metal having a second spin Hall angle, in which the first spin Hall angle and the second spin Hall angle have opposite signs (as in plus versus minus).

For example, in one embodiment, the first spin Hall layer 252 comprises a heavy metal material having a positive spin Hall angle, such as platinum, while the second spin Hall layer 253 comprises a heavy metal material having a negative spin Hall angle, such as beta phase tungsten (β-W) or beta phase tantalum (β-Ta). In another embodiment, the first spin Hall layer 252 comprises a heavy metal material having a negative spin Hall angle, such as beta phase tungsten (β-W) or beta phase tantalum (β-Ta) while the second spin Hall layer 253 comprises a heavy metal material having a positive spin Hall angle, such as platinum. Other heavy metal materials that can be used include Hf, WHf, WIr, TeBiSb, TeBi, TeSb, Bi doped with Cu, FeMn, PfMn, IrMn, and other suitable materials. The STL 271 comprises a ferromagnetic material such as one or more layers of CoFe, CoIr, NiFe, or CoFeX alloy wherein X=B, Ta, Re, or Ir.

As shown in FIG. 4A, a first electrical lead 261 is connected to one end of the first spin Hall layer 252 and of the second spin Hall layer 253, and a second electrical lead 262 is connected to the other end of the first spin Hall layer 252 and of the second spin Hall layer 253. During operation, a charge current flows through the first spin Hall layer 252 and the second spin Hall layer 253 in a cross-track direction. As shown in FIG. 4A, the charge current flows from left to right. In other embodiments, the charge current can flow from right to left.

As shown in FIG. 4B, the charge current is being flowed into the plane of the figure as represented by an "X." In other embodiments, the charge current can flow out of the plane of the figure. The charge current flowing through the first spin Hall layer 252 produces a first ampere magnetic field 282 and the second spin Hall layer 253 produces a second ampere magnetic field 283. Not wishing to be bound by theory unless explicitly set forth in the claims, it is believed that the STL 271 experiences less degradation due to being under the influences of two ampere magnetic fields in comparison to one ampere magnetic field. For example, a single ampere magnetic field applies an uni-directional force to the STL 271. In contrast, a dual ampere magnetic field 282, 283 applies balanced forces in opposite direction at certain portion of the STL 271.

The charge current through the first spin Hall layer 252 and the second spin Hall layer 253 produces spin current from the spin Hall layers 252, 253. The spin currents from the spin Hall layers 252, 253 exert a spin orbital torque that causes the magnetization of the STL 271 to switch or precess. Precession of the magnetization of the STL 271 generates an AC field, such as a microwave field 271W, which assists the write field produced by main pole 220 excited by the coil 218 (FIG. 3).

In certain embodiments, as shown in FIG. 4B, the first spin Hall layer 252, the second spin Hall layer 253, and the STL 271 form a flat surface at a media facing surface of the write head 210 so that the SOT structure 250 can be a close distance to a recording medium surface. In certain embodiments, as shown in FIG. 4B, the first spin Hall layer 252, the second spin Hall layer 253, the STL 271, the trailing shield 240, and the main pole 220 form a flat surface at a media facing surface of the write head so that the write head can be a close distance to a recording medium surface.

Figure 4C:
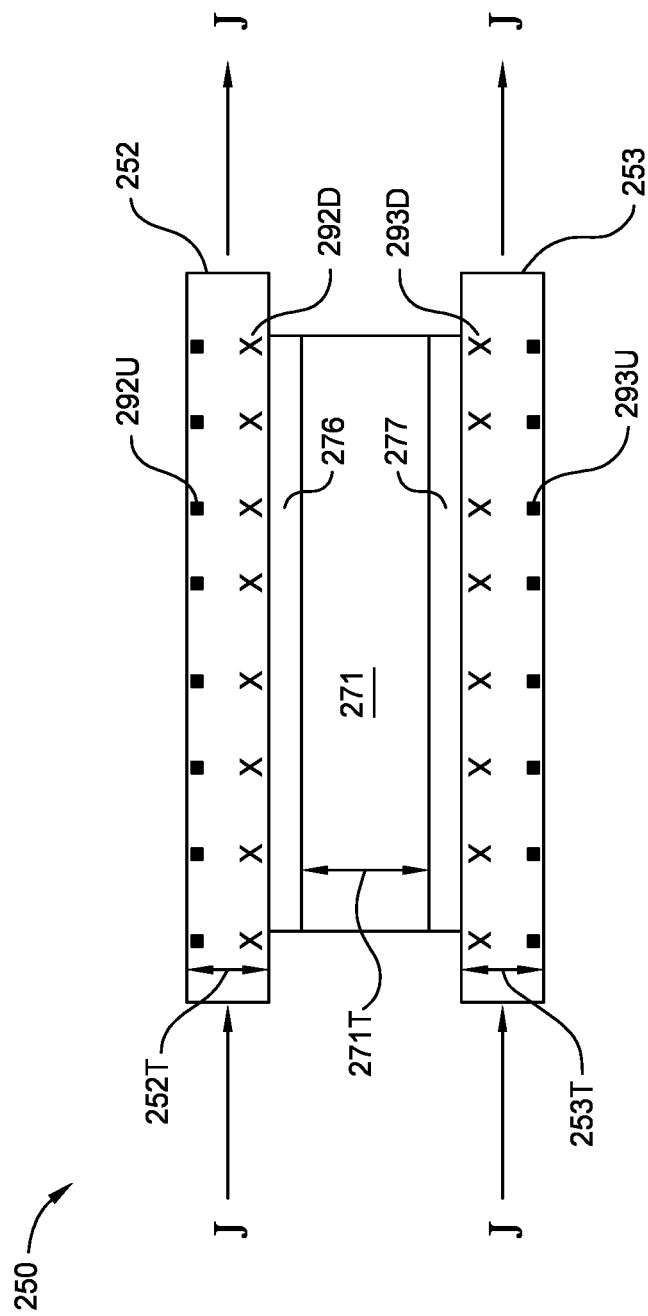
FIG. 4C is an enlarged schematic MFS view of certain embodiments of a SOT structure of FIG. 4A.

FIG. 4C is an enlarged schematic MFS view of certain embodiments of the SOT structure 250 of FIG. 4A. As shown, the first spin Hall layer 252 comprises a heavy metal material having a positive spin Hall angle, such as platinum, while the second spin Hall layer 253 comprises a heavy metal material having a negative spin Hall angle, such as beta phase tungsten (β-W) or beta phase tantalum (p-Ta). The SOT structure 250 comprises a first charge current blocking layer 276 between the first spin Hall layer 252 and the STL 271 and a second charge current blocking layer 277 between the second spin Hall layer 253 and the STL 271. The first and second charge current blocking layers 276, 277 comprise a material that is a good charge current insulator but a good spin current conductor. Materials that are a good charge current insulator but a good spin current conductor include yttrium iron garnet (YIG), magnesium oxide, and other suitable materials.

The charge current blocking layers 276, 277 reduce or prevent the charge current through the spin Hall layers 252, 253 from electrically shunting through the STL 271. If charge current is shunted through the STL 271, then less spin current will be generated by the spin Hall layers 252, 253. In certain embodiments, the first charge current blocking layer 276 and the second charge current blocking layer 277 are each formed to a thickness 276T, 277T from about 0.5 nm to about 1.5 nm.

The charge current through the first spin Hall layer 252 generates a spin current 292 (labeled as directions 292D and 292U) at the surface of the first spin Hall layer 252 with a magnetization direction down 292D proximate to the STL 271 and a magnetization direction up 292U away from the STL 271 due to the positive spin Hall angle of the first spin Hall layer 252.

The charge current through the second spin Hall layer 253 generates a spin current 293 (labeled as directions 293D and 293U) the surface of the second spin Hall layer 253 with a magnetization direction down 293D proximate to the STL 271 and magnetization direction up 293U away from the STL 271 due to the negative spin Hall angle of the second spin Hall layer 253.

For example, for a first spin Hall layer 252 of platinum and a second spin Hall layer 253 of beta phase tungsten (β-W), the spin orbital torque (τ) to the STL 271 from the spin Hall layers 252 is set forth from equation (1):

$$\tau = (I_{Pt}^S + I_w^S)\vec{m} \times (\vec{m} \times \hat{I}^S) \quad (1)$$

Since spin current 292 has a magnetization direction down 292D proximate the STL 271 from the first spin Hall layer 252 of platinum in the same direction of the magnetization direction down 293D of the spin current 293 from the second spin Hall layer 253, the spin orbital torque onto the STL 271 is additive. If the magnetization direction of the spin current adjacent the STL from the first and the second spin Hall layers 252, 253 were different, then the spin orbital torque from the first and the second spin Hall layers would be subtractive.

The spin orbital torque from the first spin Hall layer 252 and the second spin Hall layer 253 can be adjusted or balanced based upon adjusting the thicknesses 252T, 253T of each of the spin Hall layers 252, 253. In certain embodiments, each of the spin Hall layers 252, 253 is formed to a respective thickness 252T, 253T from about 3 nm to about 8 nm. In certain embodiments, the STL 271 is formed to a thickness 271T from about 3 nm to about 15 nm.

In other embodiments of FIG. 4C, a SOT structure comprises a first spin Hall layer 252 comprising a heavy metal having a negative spin Hall angle and second spin Hall layer 253 comprising a heavy metal having a positive spin Hall angle. A charge current flowing from right to left generates a spin current from the first spin Hall layer 252 with a magnetization direction up 292U proximate the STL 271 and a spin current from the second spin Hall layer 253 with a magnetization direction of up 293U proximate the STL 271.

In other embodiments of FIGS. 4A-C, a SOT structure comprises the first spin Hall layer 252 and the second spin Hall layer 253 each comprising a material that has a higher charge conductivity than the STL 271 to reduce charge current shunting through the STL 271. This SOT structure can optionally include charge current blocking layers 276, 277.

Figure 5A:
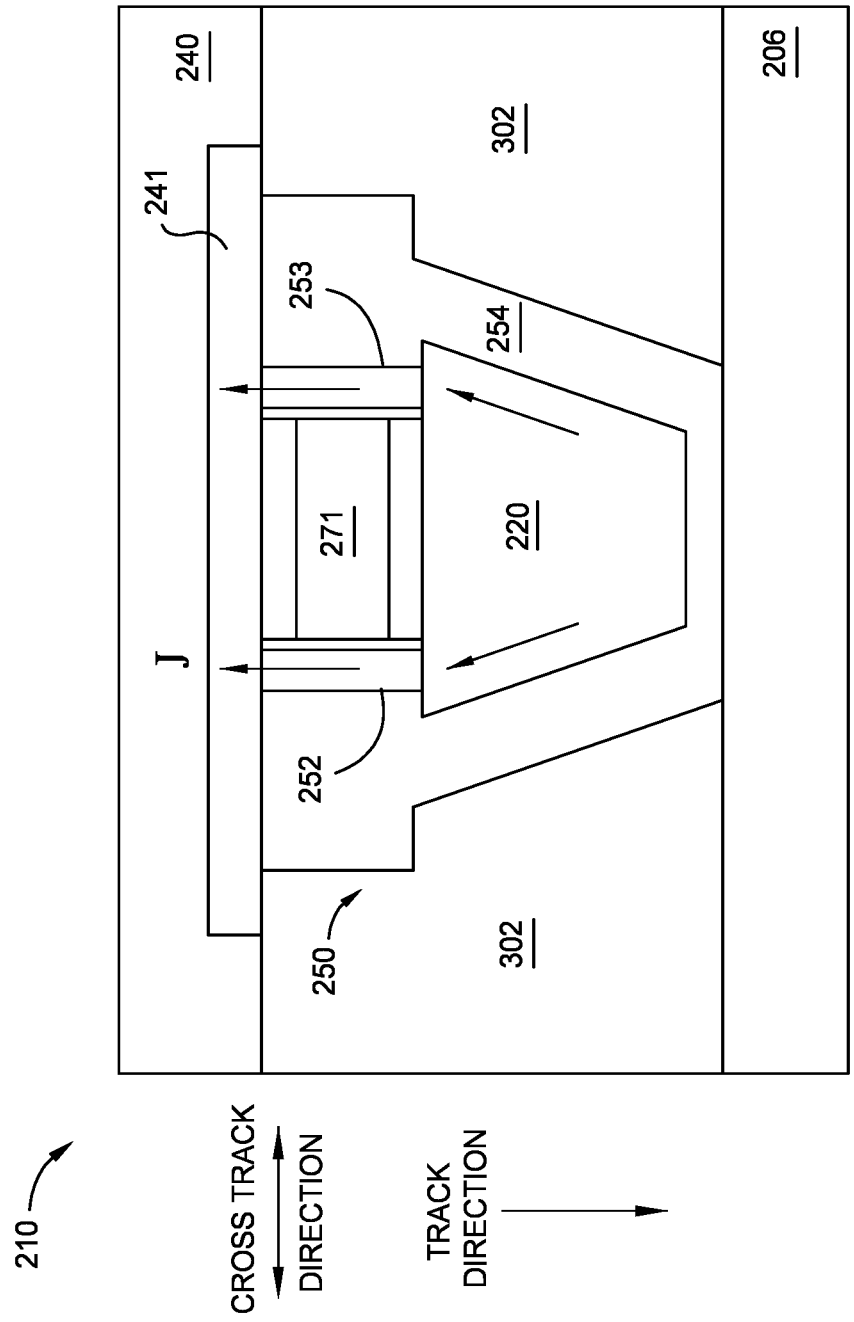
FIG. 5A is a schematic MFS view of certain embodiments of a portion of a write head.
Figure 5B:
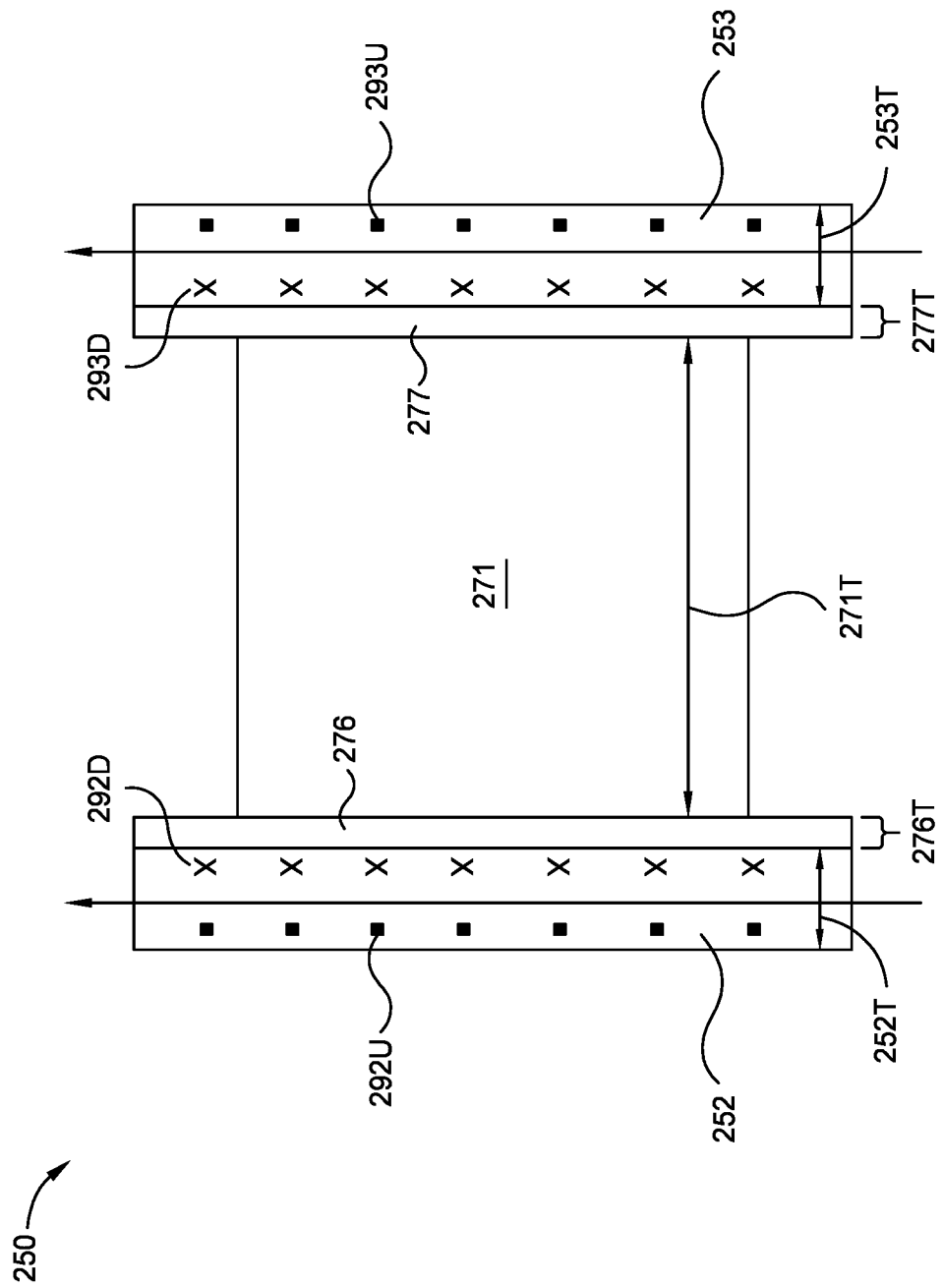
FIG. 5B is an enlarged schematic MFS view of certain embodiments of a SOT structure of FIG. 5A.

FIG. 5A is a schematic MFS view of certain embodiments of a portion of a write head 210, such as the write head of the drive 100 of FIG. 2 or other suitable magnetic media drives. FIG. 5B is an enlarged schematic MFS view of certain embodiments of the SOT structure 250 of FIG. 5A. As shown in FIGS. 5A-B, the write head 210 includes a SOT structure 250 between a trailing shield 240 and a main pole 220. As shown in FIG. 5A, the write head 210 further includes side shields 302 sandwiching the main pole 220 along the cross-track direction and a leading shield 206 in a track direction.

The SOT structure 250 comprises a first spin Hall layer 252, a second spin Hall layer 253, and a spin torque layer (STL) 271 between the first spin Hall layer 252 and the second spin Hall layer 253. The first spin Hall layer 252 comprises a heavy metal having a first spin Hall angle and the second spin Hall layer 253 comprises a heavy metal having a second spin Hall angle, in which the second spin Hall angle is opposite (as in plus versus minus) to the first spin Hall angle.

For example, in one embodiment, the first spin Hall layer 252 comprises a heavy metal material having a positive spin Hall angle, such as platinum, while the second spin Hall layer 253 comprises a heavy metal material having a negative spin Hall angle, such as beta phase tungsten (β-W) or beta phase tantalum (β-Ta). In another embodiment, the first spin Hall layer 252 comprises a heavy metal material having a negative spin Hall angle, such as beta phase tungsten (β-W) or beta phase tantalum (β-Ta) while the second spin Hall layer 253 comprises a heavy metal material having a positive spin Hall angle, such as platinum. The STL 271 comprises a ferromagnetic material such as one or more layers of CoFe, CoIr, NiFe, or CoFeX alloy wherein X=B, Ta, Re, or Ir.

As shown in FIG. 5A, the main pole 220 acts as a first electrical lead 261 connected to one end of the first spin Hall layer 252 and of the second spin Hall layer 253 and the trailing shield 240 acts as a second electrical lead 262 connected to the other end of the first spin Hall layer 252 and of the second spin Hall layer 253. During operation, a charge current flows through the first spin Hall layer 252 and the second spin Hall layer 253 in a down-track direction. As shown in FIGS. 5A-B, the charge current flows in a down-track direction. In other embodiments, the charge current can flow an up-track direction. Since there are two charge current paths as set forth by the first spin Hall layer 252 and the second spin Hall layer 253, there are two ampere magnetic fields generated by the flowing charge currents. Not wishing to be bound by theory unless explicitly set forth in the claims, it is believed that the STL 271 experiences less degradation due to being under the influences of two ampere magnetic fields in comparison to one ampere magnetic field.

The charge current through the first spin Hall layer 252 and the second spin Hall layer 253 produces spin current from the spin Hall layers 252, 253. The spin currents from the spin Hall layers 252, 253 exert a spin orbital torque that causes the magnetization of the STL 271 to switch or to precess. Precession of the magnetization of the STL 271 generates an AC field, such as a microwave field, which assists the write field produced by main pole 220 excited by the coil 218 (FIG. 3).

In certain embodiments, the first spin Hall layer 252, the second spin Hall layer 253, and the STL 271 form a flat surface at a media facing surface of the write head 210 so that the SOT structure 250 can be close to a recording medium surface. In certain embodiments, the first spin Hall layer 252, the second spin Hall layer 253, and the STL 271, the trailing shield 240, and the main pole 220 form a flat surface at a media facing surface of the write head so that the write head can be close to a recording medium surface.

As shown, the first spin Hall layer 252 comprises a heavy metal material having a positive spin Hall angle, such as platinum, while the second spin Hall layer 253 comprises a heavy metal material having a negative spin Hall angle, such as beta phase tungsten (β-W) or beta phase tantalum (β-Ta). The SOT structure 250 comprises a first charge current blocking layer 276 between the first spin Hall layer 252 and the STL 271 and a second charge current blocking layer 277 between the second spin Hall layer 253 and the STL 271. The first and second charge current blocking layers 276, 277 comprise a material that is a good charge current insulator but a good spin current conductor. Materials that are a good charge current insulator but a good spin current conductor include yttrium iron garnet (YIG), magnesium oxide, and other suitable materials. The charge current blocking layers 276, 277 reduce or prevent the charge current through the spin Hall layers 252, 253 from electrically shunting through the STL 271. If charge current is shunted through the STL 271, then less spin current will be generated by the spin Hall layers 252, 253. In certain embodiments, the first charge current blocking layer 276 and the second charge current blocking layer 277 are each formed to a thickness 276T, 277T from about 0.5 nm to about 1.5 nm.

The charge current through the first spin Hall layer 252 generates a spin current 292 (labeled as directions 292D and 292U) at the surface of the first spin Hall layer 252 with a magnetization direction down 292D proximate to the STL 271 and a magnetization direction up 292U away from the STL 271 due to the positive spin Hall angle of the first spin Hall layer 252.

The charge current through the second spin Hall layer 253 generates a spin current 293 (labeled as directions 293D and 293U) at the surface of the second spin Hall layer 253 with a magnetization direction down 293D proximate to the STL 271 and magnetization direction up 293U away from the STL 271 due to the negative spin Hall angle of the second spin Hall layer 253.

Since spin current 292 has a magnetization direction down 292D proximate the STL 271 from the first spin Hall layer 252 of platinum in the same direction of the magnetization direction down 293D of the spin current 293 from the second spin Hall layer 253, the spin orbital torque onto the STL 271 is additive. If the magnetization direction of the spin current adjacent the STL from the first and the second spin Hall layers 252, 253 were different, then the spin orbital torque from the first and the second spin Hall layers would be subtractive.

The spin orbital torque from the first spin Hall layer 252 and the second spin Hall layer 253 can be adjusted or balanced based upon adjusting the thicknesses 252T, 253T of each of the spin Hall layers 252, 253. In certain embodiments, each of the spin Hall layers 252, 253 is formed to a respective thickness 252T, 253T from about 3 nm to about 8 nm. In certain embodiments, the STL 271 is formed to a thickness 271T from about 3 nm to about 15 nm.

In other embodiments of FIG. 5B, a SOT structure comprises a first spin Hall layer 252 comprising a heavy metal having a negative spin Hall angle and second spin Hall layer 253 comprising a heavy metal having a positive spin Hall angle. A charge current flowing in a down-track direction generates a spin current from the first spin Hall layer 252 with a magnetization direction up 292U proximate the STL 271 and a spin current from the second spin Hall layer 253 with a magnetization direction of up 293U proximate the STL 271.

In other embodiments of FIGS. 5A-B, a SOT structure comprises the first spin Hall layer 252 and the second spin Hall layer 253 each comprising a material that has a higher charge conductivity than the STL 271 to reduce charge current shunting through the STL 271. This SOT structure can optionally include charge current blocking layers 276, 277.

Figure 6A:
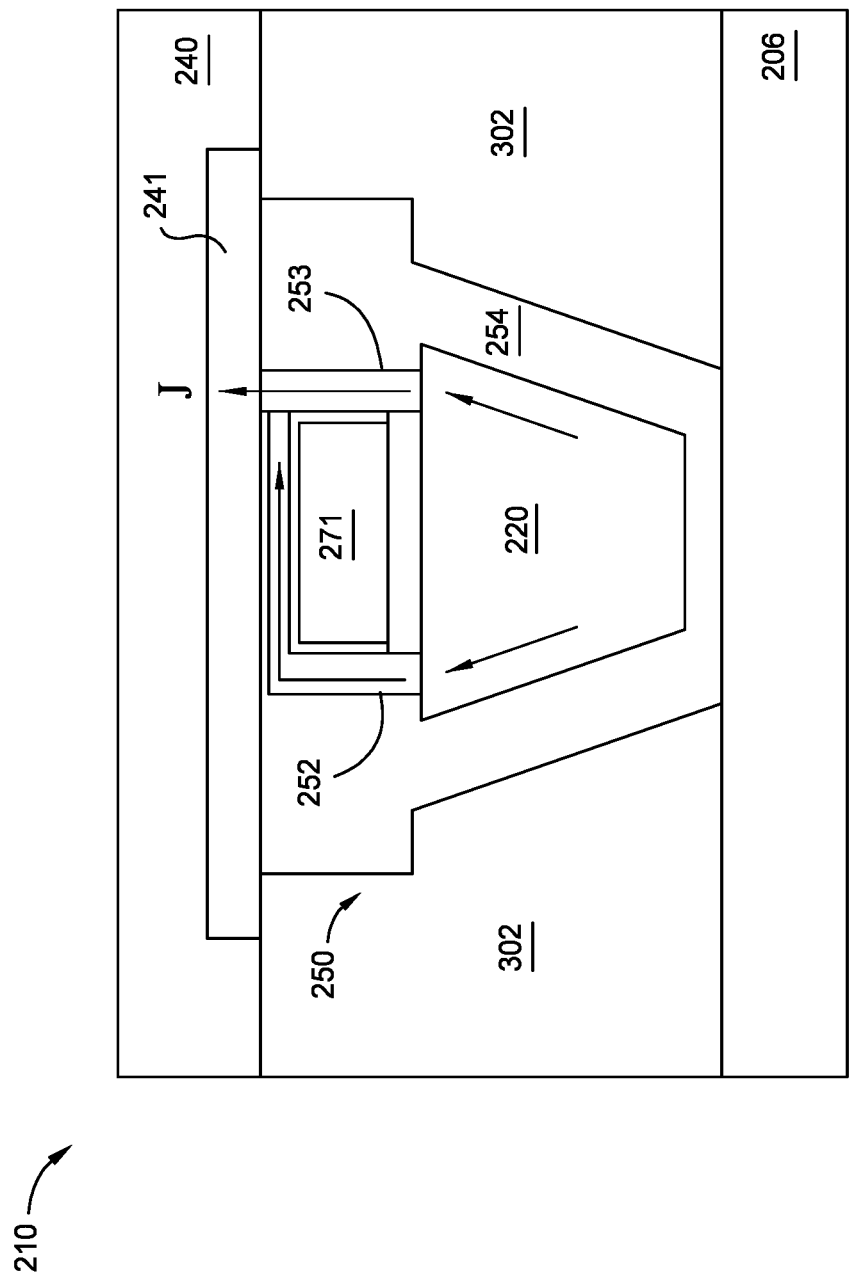
FIG. 6A is a schematic MFS view of certain embodiments of a portion of a write head.
Figure 6B:
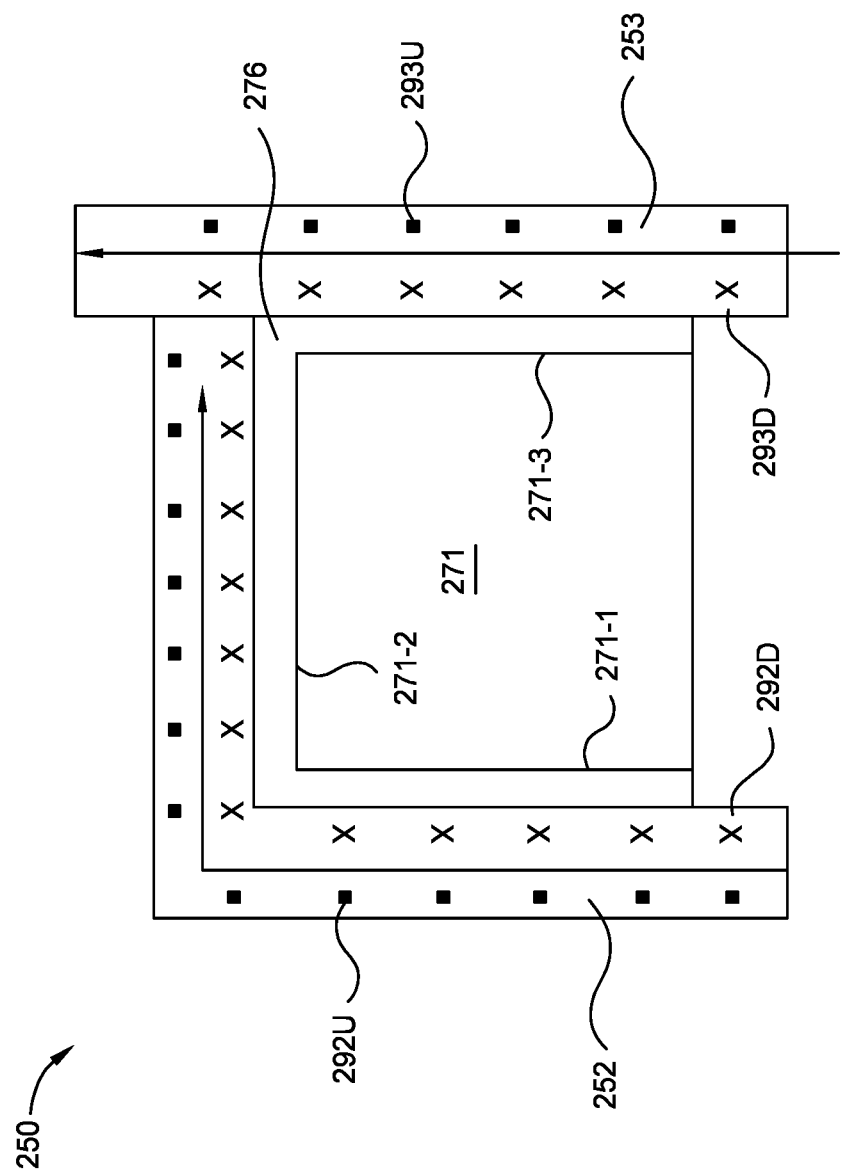
FIG. 6B is an enlarged schematic MFS view of certain embodiments of a SOT structure of FIG. 6A.

FIG. 6A is a schematic MFS view of certain embodiments of a portion of a write head 210, such as the write head of the drive 100 of FIG. 2 or other suitable magnetic media drives. FIG. 6B is an enlarged schematic MFS view of certain embodiments of the SOT structure 250 of FIG. 6A. As shown in FIGS. 6A-B, the write head 210 includes a SOT structure 250 between a trailing shield 240 and a main pole 220. As shown in FIG. 6A, the write head 210 further includes side shields 302 sandwiching the main pole 220 along the cross-track direction and a leading shield 206 in a track direction.

The SOT structure 250 comprises a first spin Hall layer 252, a second spin Hall layer 253, and a spin torque layer (STL) 271 between the first spin Hall layer 252 and the second spin Hall layer 253. The first spin Hall layer 252 comprises a heavy metal having a first spin Hall angle and the second spin Hall layer 253 comprises a heavy metal having a second spin Hall angle, in which the second spin Hall angle is opposite (as in plus versus minus) to the first spin Hall angle.

As shown in FIG. 6A, the main pole 220 acts as a first electrical lead connected to one end of the first spin Hall layer 252 and of the second spin Hall layer 253. The trailing shield 240 acts as a second electrical lead connected to the other end of the second spin Hall layer 253. The first spin Hall layer 252 is coupled to the second spin Hall layer 253 proximate to the second electrical lead of the trailing shield 240.

As shown in FIG. 6B, a charge current blocking layer 276 can be wrapped around a first side 271-1, a second side 271-2, a third side 271-3 of the media facing surface of the STL 271. The first spin Hall layer 252 is wrapped around the first side 271-1 and the second side 271-2 of the STL 271. The second spin Hall layer 253 is disposed along the third side 271-3 of the media facing surface of the STL 271. During operation, a charge current flows through the first spin Hall layer 252 in a down-track direction and a cross-track direction and a charge current flow through the second spin Hall layer 253 in a down-track direction.

In other embodiments (not shown), charge current can flow from the trailing shield, through the SOT structure, and to the main pole. The trailing shield 240 acts as a first electrical lead connected to one end of the first spin Hall layer 252 and of the second spin Hall layer 253. The main pole 220 acts as a second electrical lead connected to the other end of the second spin Hall layer 253. The first spin Hall layer 252 is coupled to the second spin Hall layer 253 proximate to the second electrical lead of the main pole 220.

As shown in FIG. 6B, the first spin Hall layer 252 comprises a heavy metal material having a positive spin Hall angle, such as platinum, while the second spin Hall layer 253 comprises a heavy metal material having a negative spin Hall angle, such as beta phase tungsten (β-W) or beta phase tantalum (β-Ta). The charge current through the first spin Hall layer 252 generates a spin current 292 at the surface of the first spin Hall layer 252 with a magnetization direction down 292D proximate the first side 271-1 and the second side 271-2 of the STL 271 and a magnetization direction up 292U away from the first side 271-1 and the second side 271-2 of the STL 271 due to the positive spin Hall angle of the first spin Hall layer 252. The charge current through the second spin Hall layer 253 generates a spin current 293 at the surface of the second spin Hall layer 253 with a magnetization direction down 293D proximate to the third side 271-3 of the STL 271 and magnetization direction up 293U away from the STL 271 due to the negative spin Hall angle of the second spin Hall layer 253. Since there are three charge current paths as along the first side 271-1, second side 271-2, and third side 271-3 of the STL 271, there are three ampere magnetic fields generated by the flowing charge currents. Not wishing to be bound by theory unless explicitly set forth in the claims, it is believed that the STL 271 experiences less degradation due to being under the influences of three ampere magnetic fields in comparison to one ampere magnetic field.

The charge current through the first spin Hall layer 252 and the second spin Hall layer 253 produces spin current from the spin Hall layers 252, 253. The spin currents from the spin Hall layers 252, 253 exert a spin orbital torque that causes the magnetization of the STL 271 to switch or precess. Precession of the magnetization of the STL 271 generates an AC field, such as a microwave field, which assists the write field produced by main pole 220 excited by the coil 218 (FIG. 3).

In certain embodiments, the first spin Hall layer 252, the second spin Hall layer 253, and the STL 271 form a flat surface at a media facing surface of the write head 210 so that the SOT structure 250 can be close to a recording medium surface. In certain embodiments, the first spin Hall layer 252, the second spin Hall layer 253, and the STL 271, the trailing shield 240, and the main pole 220 form a flat surface at a media facing surface of the write head so that the write head can be close to a recording medium surface.

In other embodiments of FIG. 6B, a SOT structure comprises a first spin Hall layer 252 comprising a heavy metal having a negative spin Hall angle and second spin Hall layer 253 comprising a heavy metal having a positive spin Hall angle. A charge current flowing through the spin Hall layers 252, 253 generates a spin current 292 (labeled as directions 292D and 292U) at the surface of the first spin Hall layer 252 with a magnetization direction up 292U proximate the first side 271-1 and the second side 271-2 of the STL 271 and generates a spin current 293 (labeled as directions 293D and 293U) at the surface of the second spin Hall layer 253 with a magnetization direction up 293U proximate to the third side 271-3 of the STL 271.

In other embodiments of FIGS. 6A-B, a SOT structure comprises the first spin Hall layer 252 and the second spin Hall layer 253 each comprising a material that has a higher charge conductivity than the STL 271 to reduce charge current shunting through the STL 271. This SOT structure can optionally include a charge current blocking layer 276.

Figure 7A:
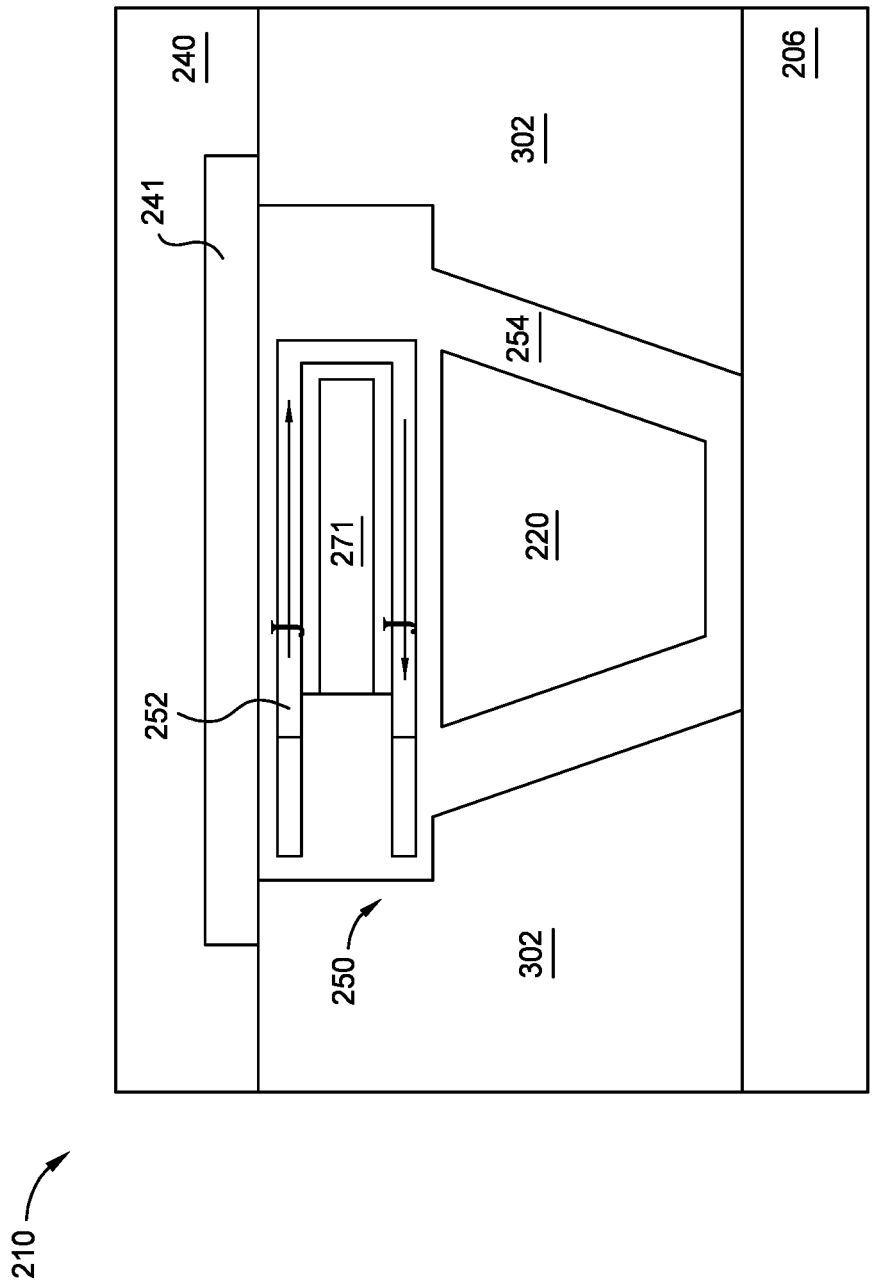
FIG. 7A is a schematic MFS view of certain embodiments of a portion of a write head.
Figure 7B:
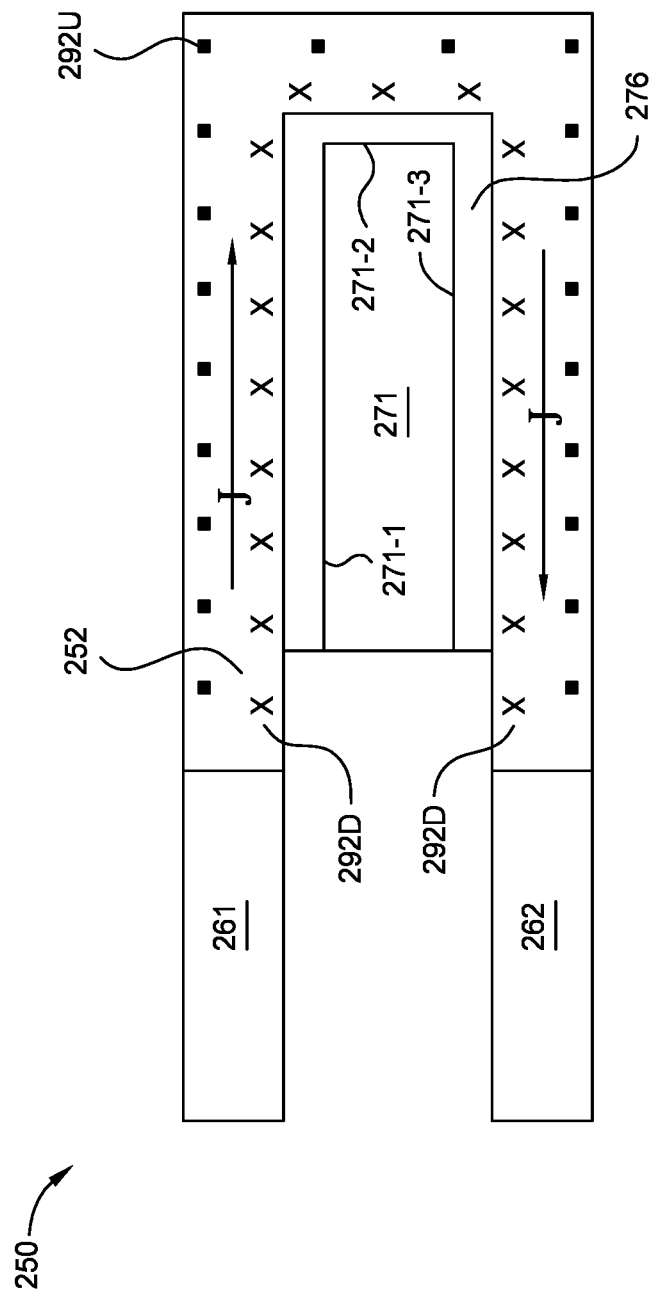
FIG. 7B is an enlarged schematic MFS view of certain embodiments of a SOT structure of FIG. 7A.

FIG. 7A is a schematic MFS view of certain embodiments of a portion of a write head 210, such as the write head of the drive 100 of FIG. 2 or other suitable magnetic media drives. FIG. 7B is an enlarged schematic MFS view of certain embodiments of the SOT structure 250 of FIG. 7A. As shown in FIGS. 7A-B, the write head 210 includes a SOT structure 250 between a trailing shield 240 and a main pole 220. As shown in FIG. 7A, the write head 210 further includes side shields 302 sandwiching the main pole 220 along the cross-track direction and a leading shield 206 in a track direction.

As shown in FIG. 7B, a charge current blocking layer 276 can be wrapped around a first side 271-1, a second side 271-2, a third side 271-3 of the media facing surface of the STL 271. The SOT structure 250 comprises a spin Hall layer 252 wrapped around a first side 271-1, a second side 271-2, a third side 271-3 of the media facing surface of the STL 271. A first electrical lead 261 is connected to one end of the spin Hall layer 252 and a second electrical lead 262 is connected to the other end of the spin Hall layer 252. During operation, a charge current flows through the spin Hall layer 252 around the STL 271 in a clockwise direction as shown in FIG. 7B. In other embodiments, the charge current can flow in a counter-clockwise direction. Since there are three charge current directions of a first charge current along the first side 271-1, a second charge current along the second side 271-2, and a third charge current along the third side 271-3 of the STL 271, three ampere magnetic fields are produced. Not wishing to be bound by theory unless explicitly set forth in the claims, it is believed that the STL 271 experiences less degradation due to being under the influences of three ampere magnetic fields in comparison to one ampere magnetic field.

As shown in FIG. 7B, the spin Hall layer 252 comprises a heavy metal material having a positive spin Hall angle. The charge current through the spin Hall layer 252 generates a spin current 292 (labeled as directions 292D and 292U) at the surface of the spin Hall layer 252 with the same magnetization direction down 292D proximate the first side 271-1, the second side 271-2, and the third side 271-3 of the STL 271 and a magnetization direction up 292U away from the STL 271 due to the positive spin Hall angle of the spin Hall layer 252.

In other embodiments of FIG. 7B, a SOT structure comprises a spin Hall layer 252 comprising a heavy metal having a negative spin Hall angle. A charge current flowing clockwise generates a spin current 292 at the surface of the spin Hall layer 252 with a magnetization direction up 292U proximate the first side 271-1, the second side 271-2, and the third side 271-3 of the STL 271.

In other embodiments of FIGS. 7A-B, a SOT structure comprises the spin Hall layer comprising a material that has a higher charge conductivity than the STL 271 to reduce charge current shunting through the STL 271. This SOT structure can optionally include a charge current blocking layer 276.

Figure 8A:
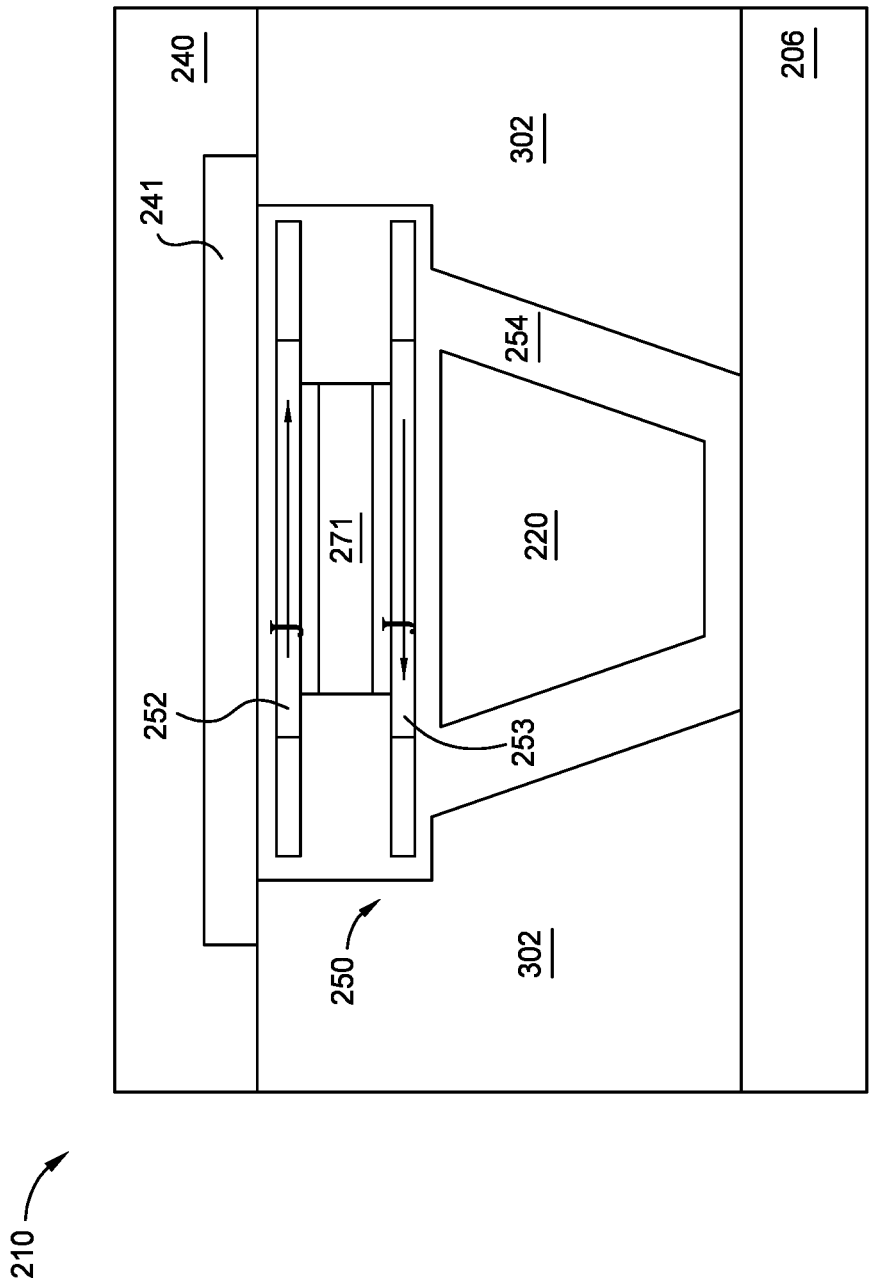
FIG. 8A is a schematic MFS view of certain embodiments of a portion of a write head.

FIG. 8A is a schematic MFS view of certain embodiments of a portion of a write head 210, such as the write head of the drive 100 of FIG. 2 or other suitable magnetic media drives. FIG. 8B is an enlarged schematic MFS view of certain embodiments of the SOT structure 250 of FIG. 8A. As shown in FIGS. 8A-B, the write head 210 includes a SOT structure 250 between a trailing shield 240 and a main pole 220. As shown in FIG. 8A, the write head 210 further includes side shields 302 sandwiching the main pole 220 along the cross-track direction and a leading shield 206 in a track direction.

As shown in FIG. 8B, a charge current blocking layer 276 can be along a first side 271-1 and a second side 271-2 of the media facing surface of the STL 271. The SOT structure 250 comprises a first spin Hall layer 252 along the first side 271-1 and a second spin Hall layer 253 along the second side 271-2 of the media facing surface of the STL 271. The first spin Hall layer 252 and the second spin Hall layer 253 have spin Hall angles of the same sign or are of the same heavy metal material.

A first electrical lead 261 and second electrical lead 262 is connected to the first spin Hall layer 252 so that the charge current flows from left to right. A first electrical lead 261 and second electrical lead 262 is connected to the second spin Hall layer 253 so that the charge current flows from right to left. Since there are two charge current flows, two ampere magnetic fields are produced. Not wishing to be bound by theory unless explicitly set forth in the claims, it is believed that the STL 271 experiences less degradation due to being under the influences of two ampere magnetic fields in comparison to one ampere magnetic field.

As shown in FIG. 8B, the first spin Hall layer 252 and the second spin Hall layer 253 each comprises a heavy metal material having a positive spin Hall angle. The charge current through the first spin Hall layer 252 generates a spin current 292 (labeled as directions 292D and 292U) at the surface of the first spin Hall layer 252 with the magnetization direction down 292D proximate the first side 271-1. The charge current through the second spin Hall layer 253 generates a spin current 293 at the surface of the second spin Hall layer 253 with the magnetization direction down 293D proximate the second side 271-2.

In other embodiments of FIG. 8B, a SOT structure comprises a first spin Hall layer 252 and a second spin Hall layer 253 each comprising a heavy metal having a negative spin Hall angle. The charge current through the first spin Hall layer 252 generates a spin current 292 at the surface of the first spin Hall layer 252 with the magnetization direction down 292U proximate the first side 271-1. The charge current through the second spin Hall layer 253 generates a spin current 293 at the surface of the second spin Hall layer 253 with the magnetization direction down 293U proximate the second side 271-2.

In other embodiments of FIGS. 8A-B, a SOT structure comprises the first and the second spin Hall layers 252, 253 each comprising a material that has a higher charge conductivity than the STL 271 to reduce charge current shunting through the STL 271. This SOT structure can optionally include a charge current blocking layer 276.

Embodiments generally relate to a magnetic media drive employing a microwave assisted magnetic recording (MAMR) write head based on spin orbital torque (SOT). In certain embodiments, a write head includes a SOT structure with dual spin Hall layers along two sides of a spin torque layer. The dual spin Hall layers have opposite spin Hall angles to provide two spin currents in the same magnetization direction proximate the spin torque layer. In certain embodiments, a write head includes a SOT structure with a single spin Hall layer wrapped around a spin torque layer to provide three spin currents in the same magnetization direction proximate the spin torque layer.

In one embodiment, a magnetic recording head includes a trailing shield and a main pole. A trailing shield gap is between the trailing shield and the main pole. A spin orbital torque structure is within the trailing shield gap. The spin orbital torque structure includes a spin torque layer having a first side and a second side at a media facing surface. A first spin Hall layer is along the first side of the spin torque layer. A second spin Hall layer is along the second side of the spin torque layer. The first spin Hall layer comprises a heavy metal material having a positive spin Hall angle. The second spin Hall layer comprises a heavy metal material having a negative spin Hall angle.

In another embodiment, a magnetic recording head includes a trailing shield and a main pole. A trailing shield gap is between the trailing shield and the main pole. A spin torque layer is within the trailing shield gap. The spin torque layer has a first side, a second side, and a third side at a media facing surface. A spin Hall structure is wrapped around the first side, the second side, and the third side of the spin torque layer.

In still another embodiment, a magnetic recording head includes a trailing shield and a main pole. A trailing shield gap is between the trailing shield and the main pole. A spin torque layer is within the trailing shield gap. The spin torque layer has a media facing surface. A spin Hall means is disposed within the trailing shield gap. The spin Hall means is for producing two or more spin current in the same direction along at least two sides of the spin torque layer at the media facing surface. The spin Hall means is also for producing two or more ampere magnetic fields.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a trailing shield;
   a main pole;
   a trailing shield gap between the trailing shield and the main pole;
   a spin torque layer within the trailing shield gap, the spin torque layer having a first side, a second side, and a third side, wherein a lowermost surface of the spin torque layer is disposed in the trailing shield gap between the trailing shield and the main pole at a media facing surface; and
   a spin Hall structure wrapped around the first side, the second side, and the third side of the spin torque layer.

2. The magnetic recording head of claim 1, wherein the spin Hall structure comprises:
   a first spin Hall layer around the first side and the second side of the spin torque layer; and
   a second spin Hall layer around the third side of the spin torque layer.

3. The magnetic recording head of claim 1, wherein the spin Hall structure, the spin torque layer, the trailing shield, and the main pole form a flat surface at the media facing surface.

4. The magnetic recording head of claim 1, wherein the spin Hall structure comprises an individual spin Hall layer around the first side, the second side, and the third side of the spin torque layer.

5. The magnetic recording head of claim 1, further comprising a charge current blocking layer between the spin Hall structure and the spin torque layer and the trailing shield.

6. The magnetic recording head of claim 1, wherein the spin Hall structure is configured to produce three ampere magnetic fields.

7. The magnetic recording head of claim 1, wherein the spin Hall structure and the spin torque layer form a flat surface at the media facing surface.

8. A data storage device, comprising the magnetic recording head of claim 1.

9. The magnetic recording head of claim 1, further comprising a charge current blocking layer wrapped around the first side, the second side, and the third side of the spin torque layer, wherein the spin Hall structure is wrapped around the charge current blocking layer.

10. The magnetic recording head of claim 9, wherein the spin Hall structure is a spin Hall layer comprising a heavy metal material having a positive spin Hall angle.

11. The magnetic recording head of claim 1, further comprising:
    side shields sandwiching the main pole along a cross-track direction; and
    a leading shield.

12. A magnetic recording head, comprising:
    a trailing shield;
    a main pole;
    a trailing shield gap between the trailing shield and the main pole;
    a spin torque layer within the trailing shield gap, the spin torque layer having a first side, a second side, and a third side at a media facing surface; and
    a spin Hall structure wrapped around the first side, the second side, and the third side of the spin torque layer, wherein the spin Hall structure comprises: a first spin Hall layer having a first spin Hall angle and a second spin Hall layer having a second spin Hall angle opposite the first spin Hall angle.

13. The magnetic recording head of claim 12, further comprising a charge current blocking layer wrapped around the first side, the second side, and the third side of the spin torque layer.

14. The magnetic recording head of claim 13, wherein the first spin Hall layer is wrapped around the charge current blocking layer at the first side and the second side of the spin torque layer.

15. The magnetic recording head of claim 13, wherein the second spin Hall layer is disposed along the charge current blocking layer at the third side of the spin torque layer.

16. The magnetic recording head of claim 12, wherein the first spin Hall layer comprises platinum and wherein the second spin Hall layer comprises beta phase tungsten or beta phase tantalum.

17. The magnetic recording head of claim 12, wherein the main pole is configured to be act as a first electrical lead connected to one end of the first spin Hall layer.

18. The magnetic recording head of claim 17, wherein the trailing shield is configured to act as a second electrical lead connected to an end of the second spin Hall layer.

19. The magnetic recording head of claim 18, wherein the first spin Hall layer is coupled to the second spin Hall layer proximate to the second electrical lead.

20. A magnetic recording head, comprising:
a trailing shield;
a main pole;
a trailing shield gap between the trailing shield and the main pole;
a spin torque layer within the trailing shield gap, the spin torque layer having a first side, a second side, and a third side at a media facing surface; and
a spin Hall structure wrapped around the first side, the second side, and the third side of the spin torque layer, wherein the spin Hall structure comprises a first spin Hall layer around the first side and the second side of the spin torque layer and a second spin Hall layer around the third side of the spin torque layer, wherein the first spin Hall layer comprises a heavy metal material having a positive spin Hall angle and wherein the second spin Hall layer comprises a heavy metal material having a negative spin Hall angle.

* * * * *